United States Patent
Kim et al.

(10) Patent No.: US 10,291,915 B2
(45) Date of Patent: May 14, 2019

(54) VIDEO DECODING METHOD AND APPARATUS AND VIDEO ENCODING METHOD AND APPARATUS

(71) Applicant: SAMSUNG ELECTRONICS CO., LTD., Suwon-si (KR)

(72) Inventors: Jae-moon Kim, Uiwang-si (KR); Ki-won Yoo, Seoul (KR); Chang-su Han, Suwon-si (KR); Sang-kwon Na, Seoul (KR); Hyung-ju Chun, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 266 days.

(21) Appl. No.: 14/640,621

(22) Filed: Mar. 6, 2015

(65) Prior Publication Data

US 2015/0256833 A1    Sep. 10, 2015

Related U.S. Application Data

(60) Provisional application No. 61/948,860, filed on Mar. 6, 2014.

(30) Foreign Application Priority Data

Jan. 9, 2015    (KR) .................. 10-2015-0003464

(51) Int. Cl.
*H04N 19/132* (2014.01)
*H04N 19/159* (2014.01)
(Continued)

(52) U.S. Cl.
CPC ......... *H04N 19/132* (2014.11); *H04N 19/159* (2014.11); *H04N 19/167* (2014.11); *H04N 19/17* (2014.11)

(58) Field of Classification Search
CPC .. H04N 19/132; H04N 19/159; H04N 19/167; H04N 19/17
(Continued)

(56) References Cited

U.S. PATENT DOCUMENTS 7,720,156 B2 * 5/2010 Kim ................ H04N 1/646
375/240
8,213,503 B2 * 7/2012 Tu .................. H04N 21/234381
375/240.03
(Continued)

FOREIGN PATENT DOCUMENTS

EP    1742478    *    1/2007    .......... H04N 19/186
JP    2000-165860 A     6/2000
(Continued)

OTHER PUBLICATIONS

Gabriellini et al. "AHG7: Coding 4:2:2 chroma format with 4:2:0 and 4:4:4 format codecs".*
(Continued)

*Primary Examiner* — Jamie J Atala
*Assistant Examiner* — James T Boylan
(74) *Attorney, Agent, or Firm* — Sughrue Mion, PLLC

(57) ABSTRACT

A video encoding method includes: receiving an image; up-sampling the received image; and changing a sample value of an up-sampling region included in the up-sampled image and encoding the up-sampled image by using the changed sample value, wherein the up-sampling region is a region inserted into the received image by the up-sampling.

7 Claims, 16 Drawing Sheets

No ICH_mode at Up-sampled line

No ICH_mode at Up-sampled line

(51) Int. Cl.
*H04N 19/167* (2014.01)
*H04N 19/17* (2014.01)

(58) Field of Classification Search
USPC .................................................. 375/240.02
See application file for complete search history.

(56) References Cited

U.S. PATENT DOCUMENTS

| | | | | |
|---|---|---|---|---|
| 8,300,691 | B2* | 10/2012 | Lee | H04N 19/50 |
| | | | | 375/240.12 |
| 2003/0016757 | A1* | 1/2003 | Kato | H04N 19/40 |
| | | | | 375/240.26 |
| 2007/0140354 | A1* | 6/2007 | Sun | H04N 19/29 |
| | | | | 375/240.24 |
| 2008/0044097 | A1 | 2/2008 | Krishnan et al. | |
| 2009/0079867 | A1* | 3/2009 | Leone | H04N 9/64 |
| | | | | 348/453 |
| 2010/0046612 | A1* | 2/2010 | Sun | H04N 19/149 |
| | | | | 375/240.02 |
| 2013/0188705 | A1* | 7/2013 | Liu | H04N 19/50 |
| | | | | 375/240.12 |
| 2014/0098857 | A1* | 4/2014 | MacInnis | H04N 19/46 |
| | | | | 375/240.03 |
| 2015/0016501 | A1* | 1/2015 | Guo | G06T 9/00 |
| | | | | 375/240.02 |
| 2015/0016512 | A1* | 1/2015 | Pu | H04N 19/176 |
| | | | | 375/240.03 |
| 2016/0029035 | A1* | 1/2016 | Nguyen | H04N 19/597 |
| | | | | 375/240.12 |
| 2016/0261805 | A1* | 9/2016 | Wang | H04N 5/23296 |
| 2016/0316213 | A1* | 10/2016 | Lai | H04N 19/186 |

FOREIGN PATENT DOCUMENTS

| | | | |
|---|---|---|---|
| KR | 10-2005-0067007 A | | 6/2005 |
| KR | 10-2008-0076665 A | | 8/2008 |

OTHER PUBLICATIONS

Gabriellini, et al., "AHG7: Coding 4:2:2 chroma format with 4:2:0 and 4:4:4 format codecs", Joint Collaborative Team on Video Coding (JCT-VC) of ITU-T SG 16 WP 3 and ISO/IEC JTC 1/SC 29/WG 11, Document: JCTVC-L0162, 12th meeting, Jan. 14, 2013-Jan. 23, 2013, 7 pages total, Geneva, Switzerland.

Weinberger, et al. "The LOCO-I Lossless Image Compression Algorithm: Principles and Standardization into JPEG-LS", IEEE Transactions on Image Processing, vol. 9, Issue No. 8, Aug. 2000, 34 pages total.

Communication dated Apr. 29, 2016, issued by the Korean Intellectual Property Office in counterpart Korean Patent Application No. 10-2015-0003464.

Communication dated Oct. 27, 2016 issued by the Korean Intellectual Property Office in counterpart Korean Patent Application No. 10-2015-0003464.

* cited by examiner

FIG. 4B

| s | c | b | d | e | f |
|---|---|---|---|---|---|
|   | a | P0 | P1 | P2 |   |

FIG. 4C

|   |   |   |   |   |   |   |   |   | c | b | d | e | f |
|---|---|---|---|---|---|---|---|---|---|---|---|---|---|
| -10 | -9 | -8 | -7 | -6 | -5 | -4 | -3 |   | P0 | P1 | P2 |   |   |

Current 3-pixel

FIG. 4D

| s | c | b | d | e | f |
|---|---|---|---|---|---|
|   | a | P0 | P1 | P2 |   |

● ◉ ● ◉
◯ ◯ ◯ ◯  No ICH_mode at Up-sampled line
● ◉ ● ◉
◯ ◯ ◯ ◯  No ICH_mode at Up-sampled line

VIDEO DECODING METHOD AND APPARATUS AND VIDEO ENCODING METHOD AND APPARATUS

RELATED APPLICATIONS

This application claims the benefit of U.S. Provisional Application No. 61/948,860, filed on Mar. 6, 2014, in the US Patent Office, and priority from Korean Patent Application No. 10-2015-0003464, filed on Jan. 9, 2015, in the Korean Intellectual Property Office, the disclosures of which are incorporated herein in their entireties by reference.

BACKGROUND

1. Field

Aspects of one or more exemplary embodiments relate to video decoding and video encoding methods and apparatuses, and more particularly, to video decoding methods and apparatuses for decoding YUV 4:2:0 format image data and video encoding methods and apparatuses for efficiently encoding YUV 4:2:0 format image data.

2. Description of the Related Art

In order to display high-resolution or high-definition video contents, contents are transmitted to a display apparatus through a display link. However, since the bandwidth of the display link is restricted, there is an increasing need to efficiently compress the high-resolution or high-definition video contents and transmit the compressed video contents through the display link. Thus, various video codecs have been developed to efficiently encode or decode high-resolution or high-definition video contents.

In the case of a video codec, encoding and decoding may be performed by inputting YUV 4:4:4 format image data. However, when an electronic apparatus uses YUV 4:2:0 format image data, it is necessary to convert YUV 4:2:0 format image data into YUV 4:4:4 format image data. In particular, in the process of converting the image data, an interpolation process is performed on the chroma data included in the image data. However, the video codec encodes chroma data generated in the interpolation process under the determination of the chroma data as informative chroma data. Therefore, unnecessary chroma data are also encoded, and an actual compression ratio in the video codec is smaller than a compression ratio calculated based on an assumption of encoding YUV 4:2:0 format image data.

SUMMARY

Aspects of one or more exemplary embodiments include video encoding and decoding methods and apparatuses for efficiently encoding and decoding YUV 4:2:0 format image data.

One or more exemplary embodiments include video encoding and decoding methods that may improve encoding efficiency by processing input image data in an image data encoding process in which the input image data are YUV 4:2:0 format image data.

Additional aspects will be set forth in part in the description which follows and, in part, will be apparent from the description, or may be learned by the practice of one or more exemplary embodiments.

According to an aspect of an exemplary embodiment, there is provided a video encoding method including: receiving an image; up-sampling the received image; changing a sample value of an up-sampling region included in the up-sampled image and encoding the up-sampled image by using the changed sample value, wherein the up-sampling region is a region inserted into the received image by the up-sampling.

There is provided the video encoding method, wherein the changed sample value is residue information of the up-sampling region, and the encoding of the up-sampled image comprises encoding residue information of the up-sampled image including the residue information of the up-sampling region.

The changed sample value may be a predetermined sample value.

There is provided the video encoding method, wherein the sample value of the up-sampling region is predicted by using a sample value that is previously encoded and decoded in a region adjacent to the up-sampling region, and the changed sample value of the up-sampling region is the predicted sample value of the up-sampling region.

The encoding of the up-sampled image may include: encoding a sample included in a region outside of the up-sampling region, according to a first prediction mode among a plurality of prediction modes, in which one of a plurality of previously encoded, decoded, and stored sample values is set as a prediction value of at least one sample by using an index representing the plurality of previously encoded, decoded, and stored sample values; and encoding a sample included in the up-sampling region according to a prediction mode other than the first prediction mode among the plurality of prediction modes.

The first prediction mode may be an index color history (ICH) mode.

The encoding of the up-sampled image may include encoding a predetermined line including only the up-sampling region according to a prediction mode other than the first prediction mode, from among the plurality of prediction modes.

According to an aspect of an exemplary embodiment, there is provided a video decoding method including: receiving a bitstream including an up-sampling image encoded by using a changed sample value of an up-sampling region included in an up-sampled image; decoding the encoded up-sampling image; and down-sampling the decoded up-sampling image.

There is provided the video decoding method, wherein the changed sample value is residue information of the up-sampling region, and the encoded up-sampling image is generated by encoding residue information of the up-sampled image including the residue information of the up-sampling region.

The changed sample value may be a predetermined sample value.

The predetermined sample value may be 0.

There is provided the video decoding method, wherein a sample value of the up-sampling region is predicted by using a sample value that is previously encoded and decoded in a region adjacent to the up-sampling region, and the encoded up-sampling image is generated by encoding the up-sampled image by using the predicted sample value of the up-sampling region.

There is provided the video decoding method, wherein the encoded up-sampling image is generated by encoding a sample included in a region outside of the up-sampling region, according to a first prediction mode among a plurality of prediction modes, in which one of a plurality of encoded, decoded, and stored sample values is set as a prediction value of at least one sample by using an index representing the plurality of encoded, decoded, and stored sample values, and encoding a sample included in the up-sampling region according to a prediction mode other than the first prediction mode, from among the plurality of prediction modes, and the bitstream includes the index.

The first prediction mode may be an index color history (ICH) mode.

There is provided the video decoding method, wherein the encoded up-sampling image is generated by encoding a predetermined line including only the up-sampling region according to a prediction mode other than the first prediction mode, from among the plurality of prediction modes.

According to an aspect of an exemplary embodiment, there is provided a video encoding apparatus including: a receiver configured to receive an image; an up-sampler configured to up-sample the received image; and an encoder configured to change a sample value of an up-sampling region included in the up-sampled image and encode the up-sampled image by using the changed sample value, wherein the up-sampling region is a region inserted into the received image by the up-sampling.

According to an aspect of an exemplary embodiment, there is provided a video decoding apparatus including: a receiver configured to receive a bitstream including an up-sampling image encoded by using a changed sample value of an up-sampling region included in an up-sampled image; a decoder configured to decode the encoded up-sampling image; and a down-sampler configured to down-sample the decoded up-sampling image.

According to an aspect of an exemplary embodiment, there is provided a non-transitory computer-readable recording medium having stored thereon a program that performs the above video encoding/decoding method.

BRIEF DESCRIPTION OF THE DRAWINGS

These and/or other aspects will become apparent and more readily appreciated from the following description of exemplary embodiments, taken in conjunction with the accompanying drawings in which:

FIGS. 4B to 4D are diagrams illustrating a method of predicting a current pixel in encoding/decoding apparatuses according to an exemplary embodiment;

DETAILED DESCRIPTION

Figure 1:
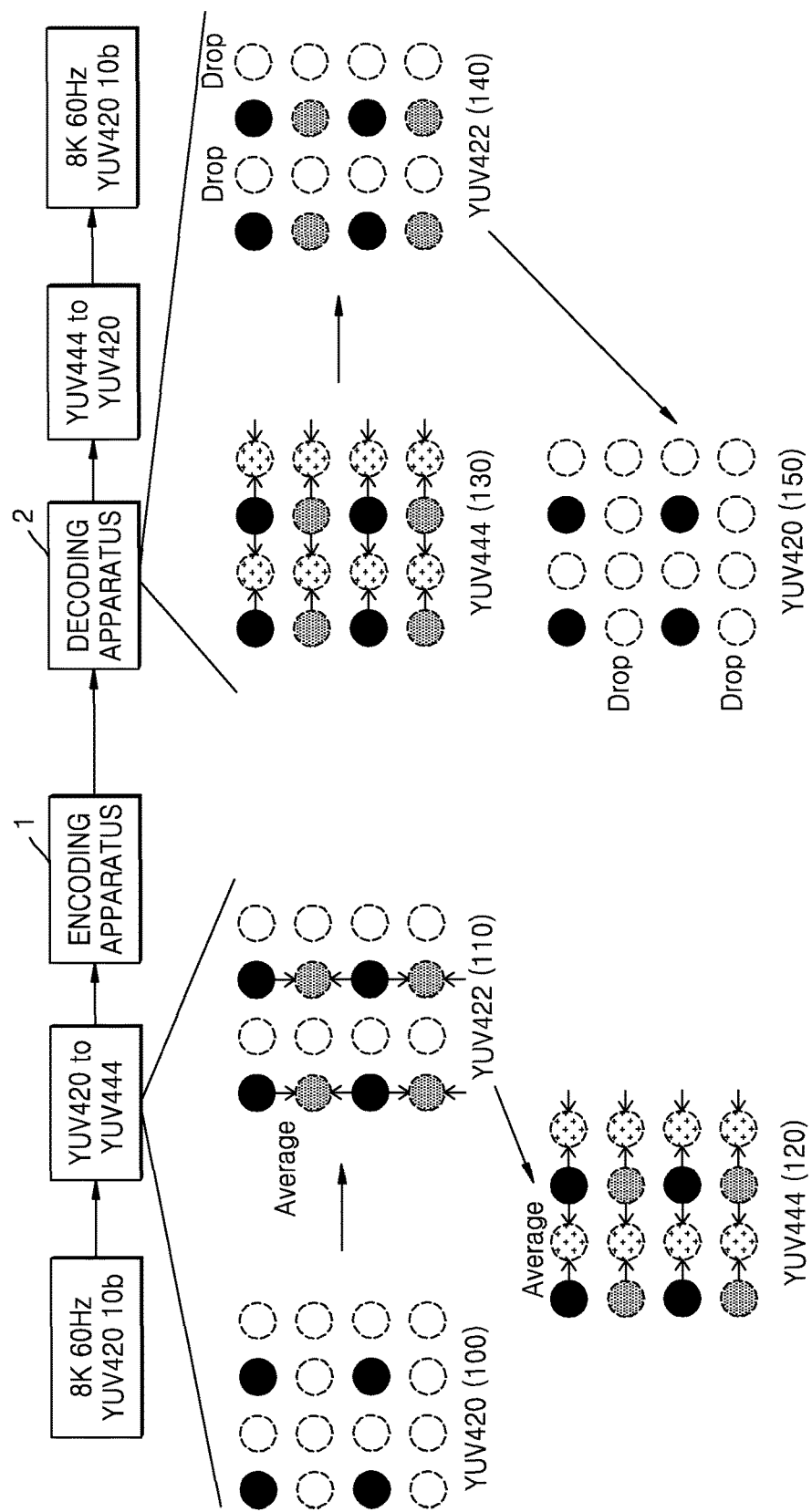
FIG. 1 is a diagram illustrating an environment for encoding and decoding image data.

Reference will now be made in detail to exemplary embodiments, examples of which are illustrated in the accompanying drawings, wherein like reference numerals refer to like elements throughout. In this regard, one or more exemplary embodiments may have different forms and should not be construed as being limited to the descriptions set forth herein. Accordingly, one or more exemplary embodiments are merely described below, by referring to the figures, to explain aspects of the present disclosure.

Hereinafter, 'images' may refer to still images of video or moving images of video.

Also, 'samples' may refer to data that are allocated to sampling positions of images and are to be processed. For example, 'samples' may be pixels in an image of a spatial domain.

FIG. 1 is a diagram illustrating an environment for encoding and decoding image data.

An encoding apparatus 1 receives an input of YUV 4:4:4 format image data and encodes the YUV 4:4:4 format image data.

Also, a decoding apparatus 2 receives an input of YUV 4:4:4 format image data, decodes the YUV 4:4:4 format image data, and outputs the decoded image data.

The encoding apparatus 1 may be included in an electronic apparatus to perform functions thereof.

For example, the encoding apparatus 1 may be included in an encoding apparatus 10 or 20, which will be described later, to perform functions thereof. However, the encoding apparatus 10 or 20 may also perform some additional and/or different functions.

Also, the decoding apparatus 2 may be included in an electronic apparatus including the decoding apparatus 2 or in a separate electronic apparatus different from the electronic apparatus, to perform functions thereof. For example, the decoding apparatus 2 may be included in a decoding apparatus 15 or 25, which will be described later, to perform functions thereof. However, the decoding apparatus 15 or 25 may also perform some additional and/or different functions.

Referring to FIG. 1, as an example, image data (8K 60 Hz YUV420 10 b) are input, wherein a definition is 8K, a frequency is 60 Hz, the number of bits of a pixel for representing luma data is 10 bits, and an image data format is a YUV 4:2:0 format.

Herein, in consideration of the definition "8K" (a resolution of 7680×4320), the frequency "60 Hz", the number of bits "10 b" of a pixel for representing luma data, and the image data format (in the case of a YUV 4:2:0 format, bits 1.5 times the number of bits used to represent luma data are required), a required data rate is 7680×4320×60×1.5×10 bits per second (bps) (=29.86 gigabits per second (Gbps)).

The YUV 4:2:0 format image data are to be compressed at 2.5:1. In this case, a data rate of the final output image data is to be 29.86 Gbps×1/2.5 (=11.94 Gbps).

In order to process image data in the encoding apparatus 1, YUV 4:2:0 format image data are converted into YUV 4:4:4 format image data. In this case, a conversion process is not performed on luma data included in the YUV 4:2:0 format image data, and an interpolation process is performed on chroma data included in the YUV 4:2:0 format image data (hereinafter referred to as YUV 4:2:0 format chroma data).

The encoding apparatus 1 may first convert YUV 4:2:0 format chroma data into YUV 4:2:2 format chroma data and then convert the YUV 4:2:2 format chroma data into YUV 4:4:4 format chroma data.

As an example, referring to FIG. 1, an average of sample values of chroma components of two adjacent odd lines in YUV 4:2:0 format chroma data 100 may be set as a sample value of a chroma component of an even line between the two adjacent odd lines, and then the YUV 4:2:0 format chroma data 100 may be converted into YUV 4:2:2 format chroma data 110. This data conversion process is referred to as up-sampling.

In detail, up-sampling refers to a process of filling (by using a sample value of an adjacent chroma pixel) a sample value of an empty chroma pixel having no data among chroma pixels corresponding to a luma pixel (e.g., chroma pixels of the same position as a luma pixel in an image).

Referring to FIG. 1, an average value of sample values of chroma components of two adjacent odd columns in the YUV 4:2:2 format chroma data 110 may be calculated, the calculated average value may be set as a sample value of a chroma component of an even column between the two adjacent odd columns, and then the YUV 4:2:2 format chroma data 110 may be converted into YUV 4:4:4 format chroma data 120. A process of converting YUV 4:2:2 format chroma data into YUV 4:4:4 format chroma data is also referred to as up-sampling.

In the process of converting YUV 4:2:0 format image data into YUV 4:4:4 format image data, the size of image data increases. Theoretically, the size of YUV 4:4:4 format image data can be up to two times larger than the size of YUV 4:2:0 format image data. Thus, in consideration of this, a required data rate of the YUV 4:4:4 format image data is 59.71 Gbps (=7680×4320×60×3×10 bps) that is about two times of 29.86 Gbps.

When the encoding apparatus 1 receives an input of YUV 4:4:4 format image data, encodes the YUV 4:4:4 format image data, and outputs the encoded image data, the image data should be compressed at a 5:1 ratio so that a data rate of the encoded image data may be 11.94 Gbps.

Thus, problematically, the compression ratio (5:1) of the YUV 4:4:4 format image data input into the encoding apparatus 1 to the encoded image data is much higher than the compression ratio (2.5:1) of the YUV 4:2:0 format image data including only significant information to the encoded image data. Herein, significant information refers to encoded image information that is related to the image, and insignificant information refers to information that is not directly related to the image. For example, insignificant information may be information including a sample value filled by filling a sample value of an empty chroma pixel having no data among the chroma pixels (i.e., the up-sampling process).

Thus, when the YUV 4:2:0 format image data are converted into YUV 4:4:4 format image data, it is necessary to up-sample the image data in order to efficiently compress (i.e., encode) the image data.

The encoding apparatus 1 is not limited to receiving an input of YUV 4:4:4 format image data, encoding the YUV 4:4:4 format image data, and outputting the encoded image data. For example, the configuration of the encoding apparatus 1 may be partially modified to encode image data by inputting YUV 4:2:0 format image data including only significant information.

The encoding apparatus 1 needs to efficiently compress the image data by minimizing the image data including information related to an up-sampled pixel or by not encoding data of an up-sampled pixel by processing the image data by inputting the YUV 4:2:0 format image data.

For example, the encoding apparatus 1 needs to efficiently compress the image data by not encoding data of an up-sampled pixel or by minimizing the image data including information related to an up-sampled pixel.

The decoding apparatus 2 receives a bitstream including image information encoded by the encoding apparatus 1.

The decoding apparatus 2 inversely performs the process performed by the encoding apparatus 1 by using the encoded image information obtained from the bitstream. Thus, the decoding apparatus 2 may reconstruct the YUV 4:4:4 format image data by decoding the image information encoded by the encoding apparatus 1.

In this case, image data including only significant information are YUV 4:2:0 format image data, the YUV 4:2:0 format image data are up-sampled, and the up-sampled image data are encoded. Therefore, data used to display an image by the electronic apparatus should also be YUV 4:2:0 format image data. Thus, a process of converting YUV 4:4:4 format image data into YUV 4:2:0 format image data is additionally performed.

In detail, referring to FIG. 1, sample values of chroma components of adjacent even columns in chroma data 130 included in YUV 4:4:4 format image data may be dropped and the chroma data may be converted into YUV 4:2:2 format chroma data 140. This process is referred to as down-sampling. In detail, down-sampling refers to a process of dropping a sample value of a chroma pixel including no significant information among chroma pixels corresponding to a luma pixel (e.g., chroma pixels of the same position as a luma pixel in an image).

Referring to FIG. 1, sample values of chroma components of adjacent even lines in YUV 4:2:2 format chroma data 140 may be dropped and the YUV 4:2:2 format chroma data 140 may be converted into YUV 4:2:0 format chroma data 150. A process of converting YUV 4:2:2 format chroma data into YUV 4:2:0 format chroma data is referred to as down-sampling.

The electronic apparatus may reconstruct the image by using the YUV 4:2:0 format chroma data 150. The electronic apparatus may display the reconstructed image, and a user may view the displayed image.

When an up-sampling method is used for efficient compression in the process of converting YUV 4:2:0 format image data into YUV 4:4:4 format image data before the image data are input into the encoding apparatus 1, it is necessary to use a down-sampling method in the process of converting YUV 4:4:4 format image data into YUV 4:2:0 format image data in an image decoding process.

When the configuration of the encoding apparatus 1 is partially modified to encode the image data by inputting the YUV 4:2:0 format image data including only significant information, it is necessary to use a method to efficiently decode the compressively-encoded image data by minimizing the image data including information related to an up-sampled pixel or by not encoding data of an up-sampled pixel by modifying the decoding apparatus 2 to output the YUV 4:2:0 format image data including only significant information.

Figure 2A:
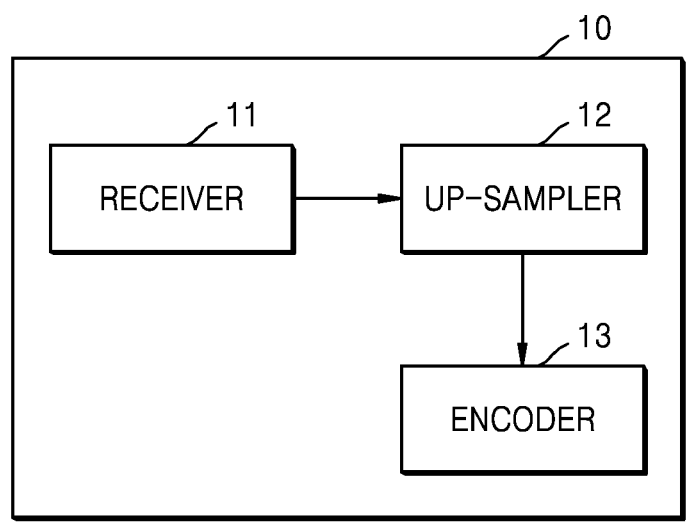
FIG. 2A is a block diagram illustrating an encoding apparatus according to an exemplary embodiment.

FIG. 2A is a block diagram of an encoding apparatus 10 according to an exemplary embodiment.

The encoding apparatus 10 according to an exemplary embodiment may receive an image, up-sample the received image, change a sample value of an up-sampling region included in the up-sampled image, and encode the up-sampled image by using the changed sample value, thereby improving the encoding efficiency. Herein, the up-sampling region is a region inserted into the received image by the up-sampling.

Referring to FIG. 2A, the encoding apparatus 10 includes a receiver 11, an up-sampler 12, and an encoder 13.

The receiver 11 receives an image. In detail, the image may include a luma image having one component and a chroma image having a plurality of components. The image is an image in a YUV color space, the luma image is an image of a Y component, and the chroma image is an image of U and V components. For example, the image may be a YUV 4:2:0 format image.

The up-sampler 12 may up-sample the received image. For example, the up-sampler 12 may convert a YUV 4:2:0 format image into a YUV 4:4:4 format image.

The encoder 13 may encode the image up-sampled by the up-sampler 12. The encoder 13 may perform functions of the encoding apparatus 1.

In detail, the encoder 13 may change a sample value of an up-sampling region included in the up-sampled image and encode the up-sampled image by using the changed sample value. In this case, the changed sample value may be residue information of the up-sampling region, and the encoder 13 may encode residue information of the up-sampled image including the residue information of the up-sampling region. Herein, the changed sample value may be a predetermined sample value. In detail, the predetermined sample value may be 0.

The encoder 13 may predict the sample value of the up-sampling region by using a sample value that is previously encoded and decoded in a region adjacent to the up-sampling region, and the changed sample value of the up-sampling region may be the predicted sample value of the up-sampling region. Herein, the predicted sample value of the up-sampling region may be the sample value that is previously encoded and decoded in the adjacent region.

The encoder 13 may encode a sample included in a region other than the up-sampling region by using an index representing a plurality of previously encoded, decoded, and stored sample values. The encoder 13 may encode a sample included in a region other than the up-sampling region according to a first prediction mode in which one of a plurality of previously encoded, decoded, and stored sample values is set as a prediction value of at least one sample by using an index representing the plurality of previously encoded, decoded, and stored sample values. In detail, the first prediction mode may be an index color history (ICH) mode. The ICH mode will be described later in detail with reference to FIG. 7B.

The encoder 13 may encode a sample included in the up-sampling region according to a prediction mode other than the first prediction mode among the plurality of prediction modes. In detail, the encoder 13 may predict a sample value included in the up-sampling region according to a prediction mode other than the first prediction mode among the plurality of prediction modes, and encode a sample included in the up-sampling region by using the predicted sample value.

The encoder 13 may not encode a predetermined line including only the up-sampling region according to a prediction mode other than the first prediction mode among the plurality of prediction modes.

Figure 2B:
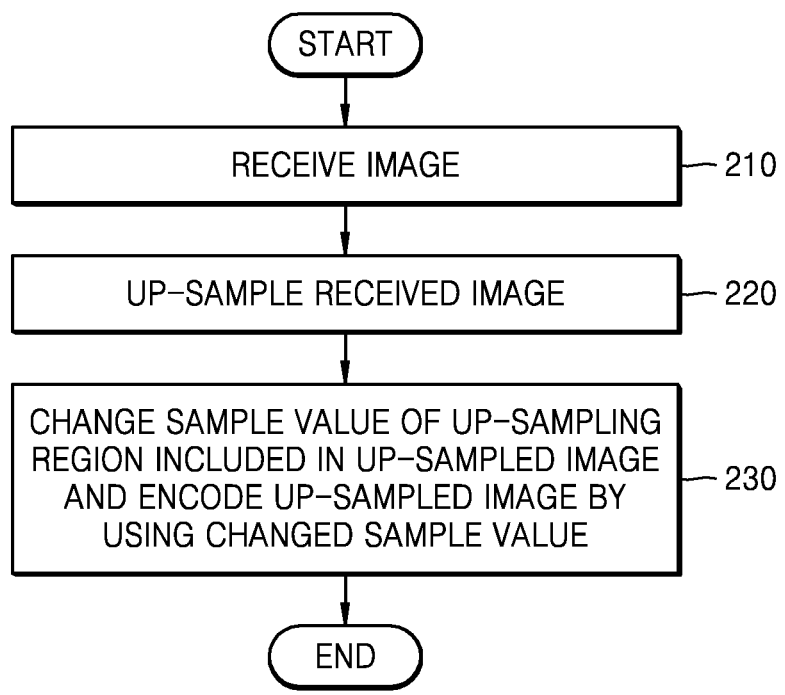
FIG. 2B is a flowchart illustrating an encoding method according to an exemplary embodiment.

FIG. 2B is a flowchart of an encoding method according to an exemplary embodiment.

In operation 210, the encoding apparatus 10 may receive an image. In detail, the image may include a luma image having one component and a chroma image having a plurality of components.

The image is an image in a YUV color space, the luma image is an image of a Y component, and the chroma image is an image of U and V components. For example, the image may be a YUV 4:2:0 format image.

In operation 220, the encoding apparatus 10 may up-sample the received image. In detail, the encoding apparatus 10 may convert a YUV 4:2:0 format image into a YUV 4:4:4 format image.

In operation 230, the encoding apparatus 10 may change a sample value of an up-sampling region included in the up-sampled image and encode the up-sampled image by using the changed sample value.

Figure 2C:
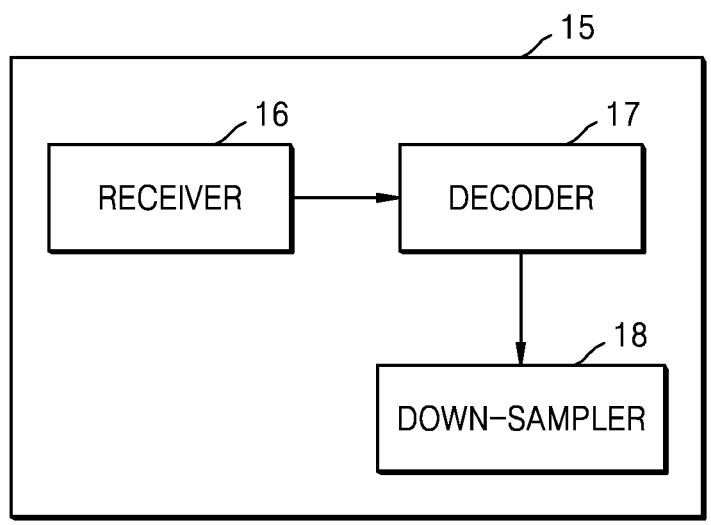
FIG. 2C is a block diagram illustrating a decoding apparatus according to an exemplary embodiment.

FIG. 2C is a block diagram of a decoding apparatus 15 according to an exemplary embodiment.

Referring to FIG. 2C, the decoding apparatus 15 may include a receiver 16, a decoder 17, and a down-sampler 18.

The receiver 16 may receive a bitstream including an encoded up-sampling image. In detail, the bitstream may include an up-sampling image encoded by using a changed sample value of an up-sampling region included in an up-sampled image.

In this case, the changed sample value may be residue information of the up-sampling region, and thus the encoded up-sampling image may be generated by encoding residue information of the up-sampled image including the residue information of the up-sampling region. The changed sample value may be 0.

A sample value of the up-sampling region may be predicted by using a sample value that is previously encoded and decoded in a region adjacent to the up-sampling region, and the encoded up-sampling image may be generated by encoding the up-sampled image by using the predicted sample value of the up-sampling region.

The encoded up-sampling image may be generated by predicting a sample included in a region other than the up-sampling region by using an index representing a plurality of encoded, decoded, and stored sample values and encoding a sample included in a region other than the up-sampling region according to the prediction. In detail, the encoded up-sampling image may be generated by encoding a sample included in a region other than the up-sampling region according to a first prediction mode in which one of a plurality of encoded, decoded, and stored sample values is set as a prediction value of at least one sample by using an index representing the plurality of encoded, decoded, and stored sample values. Herein, the first prediction mode may be an ICH mode.

In detail, according to the first prediction mode, the encoded up-sampling image may be information that is generated by setting one of a plurality of encoded, decoded, and stored sample values as a prediction value of at least one sample by using an index, and encoding a sample included in a region other than the up-sampling region on the basis of a prediction value of a predicted sample.

The encoded up-sampling image may be generated by encoding a predetermined line including only the up-sampling region according to a prediction mode other than the first prediction mode among a plurality of prediction modes.

The decoder 17 may decode the encoded up-sampling image. The decoder 17 may perform functions of the decoding apparatus 2. In detail, the decoder 17 decodes the encoded up-sampling image by using encoding information included in the bitstream. The encoding information may include mode information and relevant parameter information generated in the process of encoding an up-sampled image by the encoding apparatus 10. In order to decode the encoded up-sampling image, the decoder 17 inversely performs the process of encoding the up-sampling image by the encoding apparatus 10 (in detail, the encoder 13). Herein, the decoded up-sampling image may be a YUV 4:4:4 format image.

The down-sampler 18 down-samples the decoded up-sampling image. For example, the down-sampler 18 may convert a YUV 4:4:4 format image into a YUV 4:2:0 format image.

Figure 2D:
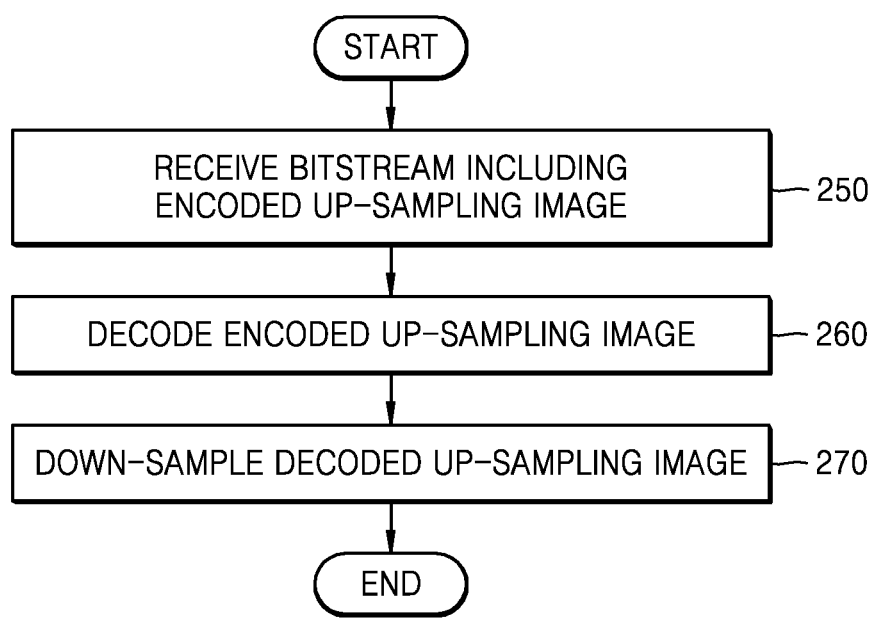
FIG. 2D is a flowchart illustrating a decoding method according to an exemplary embodiment.

FIG. 2D is a flowchart of a decoding method according to an exemplary embodiment.

Referring to FIG. 2D, in operation 250, the decoding apparatus 15 may receive a bitstream including an encoded up-sampling image. In detail, the bitstream may include an up-sampling image encoded by using a changed sample value of an up-sampling region included in an up-sampled image.

In this case, the changed sample value may be residue information of the up-sampling region, and thus the encoded up-sampling image may be generated by encoding residue information of the up-sampled image including the residue information of the up-sampling region. The changed sample value may be 0.

A sample value of the up-sampling region may be predicted by using a sample value that is previously encoded and decoded in a region adjacent to the up-sampling region, and the encoded up-sampling image may be generated by encoding the up-sampled image by using the predicted sample value of the up-sampling region.

The encoded up-sampling image may be generated by predicting a sample included in a region other than the up-sampling region by using an index representing a plurality of encoded, decoded, and stored sample values and encoding a sample included in a region other than the up-sampling region according to the prediction. In detail, the encoded up-sampling image may be generated by encoding a sample included in a region other than the up-sampling region according to a first prediction mode in which one of a plurality of encoded, decoded, and stored sample values is set as a prediction value of at least one sample by using an index representing the plurality of encoded, decoded, and stored sample values. Herein, the first prediction mode may be an ICH mode. The plurality of prediction modes may include a prediction mode that does not perform a prediction on a sample.

In detail, according to the first prediction mode, the encoded up-sampling image may be information that is generated by setting one of a plurality of encoded, decoded, and stored sample values as a prediction value of a sample included in a region other than the up-sampling region by using an index, and encoding a sample included in a region other than the up-sampling region on the basis of a prediction value of a predicted sample.

The encoded up-sampling image may be generated by encoding a predetermined line including only the up-sampling region according to a prediction mode other than the first prediction mode among the plurality of prediction modes.

In operation 260, the decoding apparatus 15 may decode the encoded up-sampling image. The decoding apparatus 15 may generate a decoded up-sampling image by decoding the encoded up-sampling image. For example, the image generated by decoding the encoded up-sampling image by the decoding apparatus 15 may be a YUV 4:4:4 format image.

In operation 270, the decoding apparatus 15 may down-sample the decoded up-sampling image. For example, the decoding apparatus 15 may convert the YUV 4:4:4 format image into a YUV 4:2:0 format image.

The decoding apparatus 15 may reconstruct the image by using the down-sampled image.

Figure 3A:
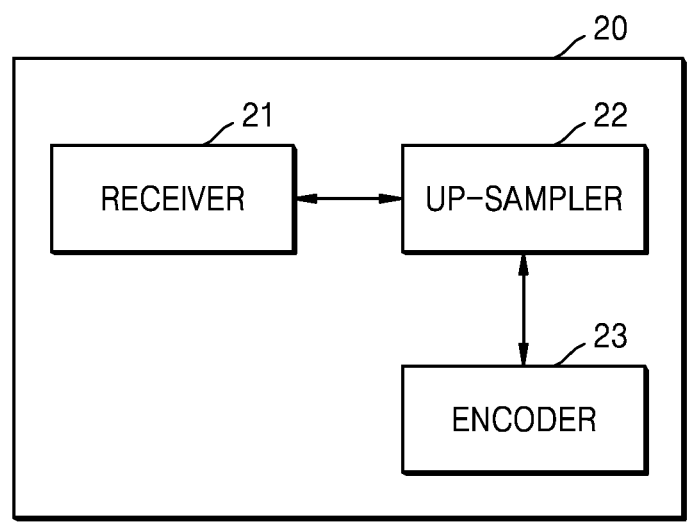
FIG. 3A is a block diagram illustrating an encoding apparatus according to an exemplary embodiment.

FIG. 3A is a block diagram of an encoding apparatus 20 according to an exemplary embodiment.

The encoding apparatus 20 according to an exemplary embodiment receives an image, up-samples the received image, and encodes a sample included in an up-sampling region according to a prediction mode other than a first prediction mode among a plurality of prediction modes. In the first prediction mode, one of a plurality of previously encoded, decoded, and stored sample values is set as a prediction value of at least one sample by using an index representing the plurality of previously encoded, decoded, and stored sample values. The encoding apparatus 20 may minimize an index transmission overhead for the first prediction mode by encoding a sample included in the up-sampling region according to a prediction mode other than the first prediction mode among the plurality of prediction modes. Herein, the first prediction mode may be an ICH mode.

Referring to FIG. 3A, the encoding apparatus 20 may include a receiver 21, an up-sampler 22, and an encoder 23.

The receiver 21 may receive image data. In detail, the image may be a YUV 4:2:0 format image.

The up-sampler 22 may up-sample the image received by the receiver 21. The up-sampler 22 may convert a YUV 4:2:0 format image into a YUV 4:4:4 format image.

The encoder 23 encodes a sample included in the up-sampling region according to a prediction mode other than the first prediction mode among the plurality of prediction modes. In the first prediction mode, one of a plurality of previously encoded, decoded, and stored sample values is set as a prediction value of at least one sample by using an index representing the plurality of previously encoded, decoded, and stored sample values.

The encoder 23 may encode a sample included in a region other than the up-sampling region according to the first prediction mode among the plurality of prediction modes.

The up-sampling image encoded by the encoder 23 may include a sample included in the encoded up-sampling region and a sample included in a region other than the encoded up-sampling region.

The encoder 23 may encode a predetermined line including only the up-sampling region according to a prediction mode other than the first prediction mode among the plurality of prediction modes.

Figure 3B:
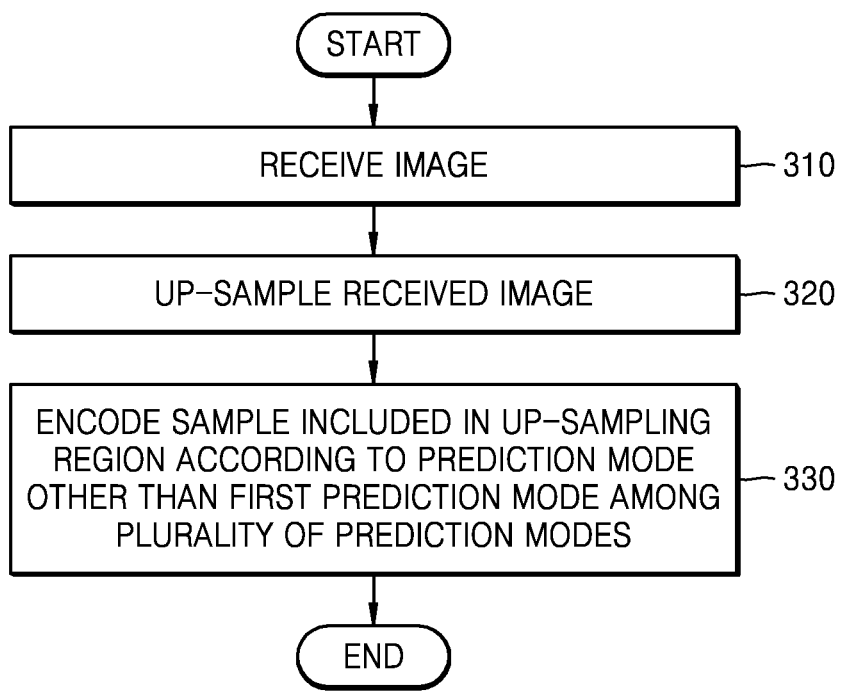
FIG. 3B is a flowchart illustrating an encoding method according to an exemplary embodiment.

FIG. 3B is a flowchart of an encoding method according to an exemplary embodiment.

Referring to FIG. 3B, in operation 310, the encoding apparatus 20 may receive an image. For example, the encoding apparatus 20 may receive a YUV 4:2:0 format image In operation 320, the encoding apparatus 20 may up-sample the received image. For example, the encoding apparatus 20 may convert a YUV 4:2:0 format image into a YUV 4:4:4 format image.

In operation 330, the encoding apparatus 20 encodes a sample included in the up-sampling region according to a prediction mode other than a first prediction mode among a plurality of prediction modes. In the first prediction mode, one of a plurality of previously encoded, decoded, and stored sample values is set as a prediction value of at least one sample by using an index representing the plurality of previously encoded, decoded, and stored sample values.

Figure 3C:
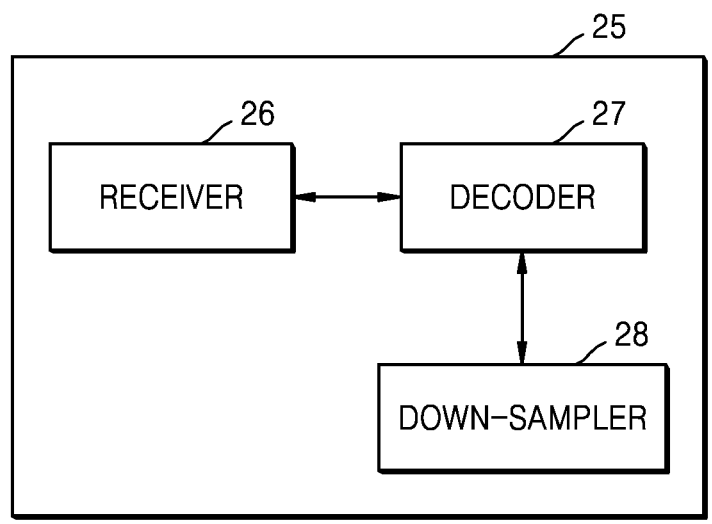
FIG. 3C is a block diagram illustrating a decoding apparatus according to an exemplary embodiment.

FIG. 3C is a block diagram of a decoding apparatus 25 according to an exemplary embodiment.

Referring to FIG. 3C, the decoding apparatus 25 includes a receiver 26, a decoder 27, and a down-sampler 28.

The receiver 26 may receive a bitstream including an encoded up-sampling image. In this case, the encoded up-sampling image may be generated by encoding a sample included in the up-sampling region according to a prediction mode other than a first prediction mode among a plurality of prediction modes. In the first prediction mode, one of a plurality of previously encoded, decoded, and stored sample values is set as a prediction value of at least one sample by using an index representing the plurality of previously encoded, decoded, and stored sample values. In detail, the first prediction mode may be an ICH mode.

The decoder 27 may decode the encoded up-sampling image. The decoder 27 may perform functions of the decoding apparatus 2. However, the decoder 27 may also perform some additional functions and/or different functions than the decoding apparatus 2.

The decoder 27 may decode a sample included in the encoded up-sampling region according to a prediction mode other than the first prediction mode among the plurality of prediction modes. The decoding apparatus 27 may generate a decoded up-sampling image by decoding the encoded up-sampling image.

For example, the image generated by the decoding operation of the decoder 27 may be a YUV 4:4:4 format image.

The down-sampler 28 may down-sample the decoded up-sampling image. For example, the down-sampler 28 may convert the YUV 4:4:4 format image into a YUV 4:2:0 format image.

The down-sampler 28 may reconstruct the image by using the YUV 4:2:0 format image.

Figure 3D:
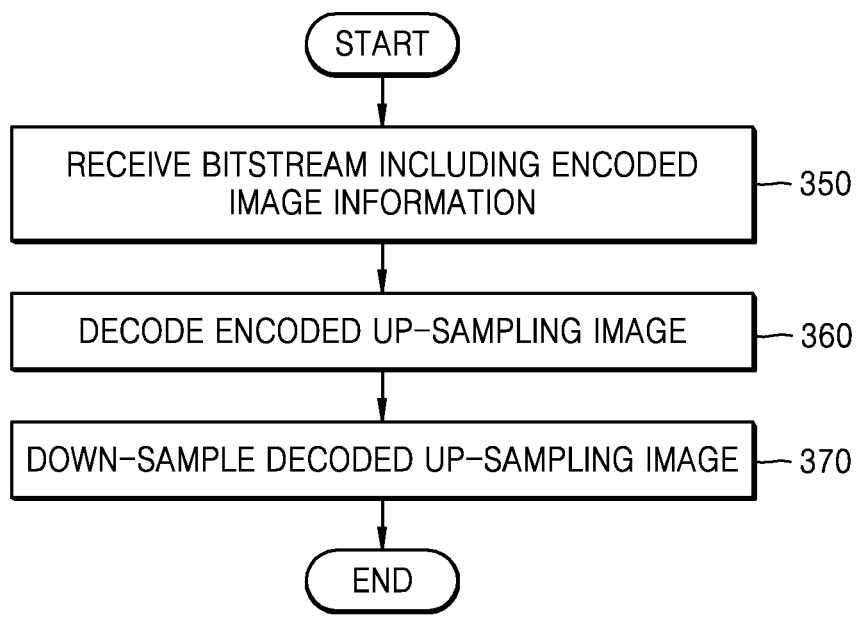
FIG. 3D is a flowchart illustrating a decoding method according to an exemplary embodiment.

FIG. 3D is a flowchart of a decoding method according to an exemplary embodiment.

image may be generated by encoding a sample included in the up-sampling region according to a prediction mode other than a first prediction mode among a plurality of prediction modes. In the first prediction mode, one of a plurality of previously encoded, decoded, and stored sample values is set as a prediction value of at least one sample by using an index representing the plurality of previously encoded, decoded, and stored sample values. In detail, the first prediction mode may be an ICH mode.

In operation 360, the decoding apparatus 25 decodes the encoded up-sampling image. The decoding apparatus 25 may decode a sample included in the encoded up-sampling region according to a prediction mode other than the first prediction mode among the plurality of prediction modes. The decoding apparatus 25 may generate a decoded up-sampling image by decoding the encoded up-sampling image. Herein, the up-sampling image decoded by the decoding apparatus 25 may be a YUV 4:4:4 format image.

In operation 370, the decoding apparatus 25 may down-sample the decoded up-sampling image. For example, the decoding apparatus 25 may convert the YUV 4:4:4 format image into a YUV 4:2:0 format image. The decoding apparatus 25 may reconstruct the image by using the YUV 4:2:0 format image.

Figure 4A:
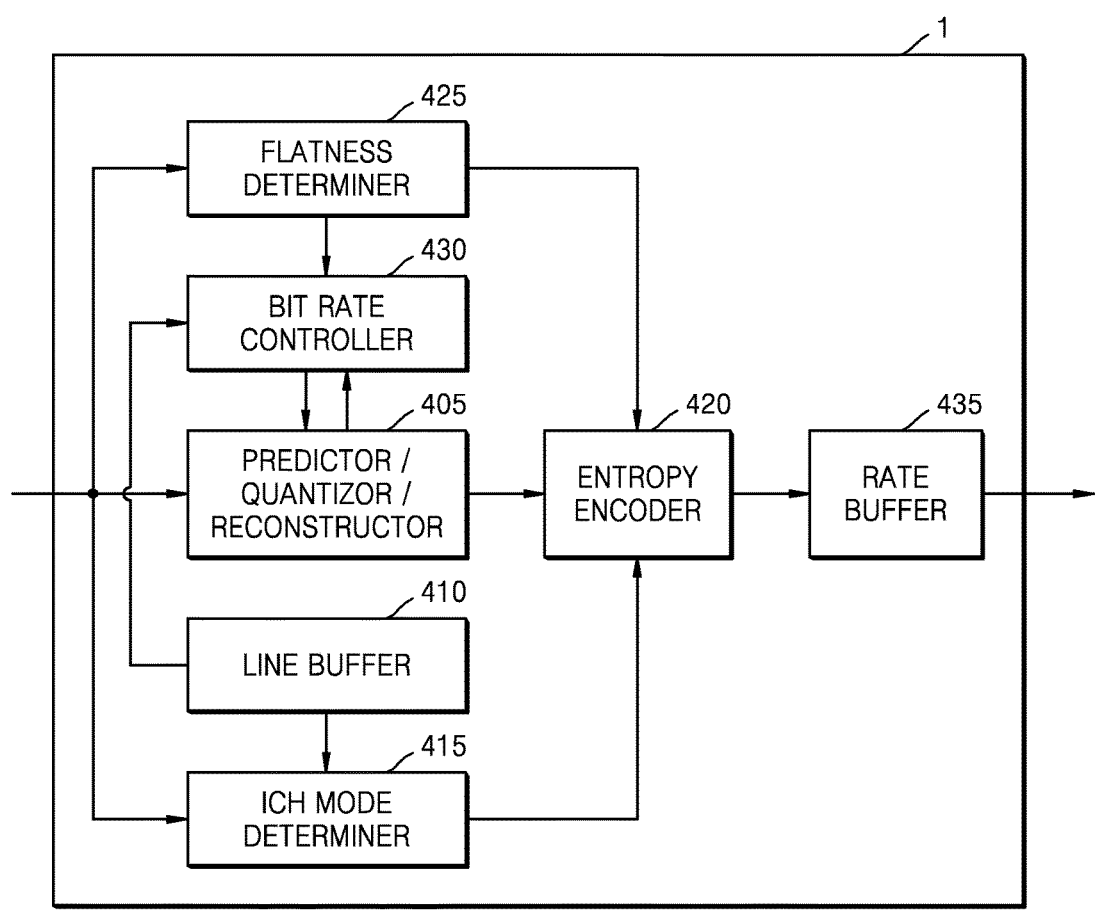
FIG. 4A is a block diagram illustrating an encoding apparatus according to an exemplary embodiment.

FIG. 4A is a block diagram of an encoding apparatus 1 according to an exemplary embodiment.

Referring to FIG. 4A, the encoding apparatus 1 includes a predicting, quantizing, and reconstructing unit (i.e., predictor/quantizor/reconstructor) 405, a line buffer 410, an ICH mode determiner 415, an entropy encoder 420, a flatness determiner 425, a bit rate controller 430, and a rate buffer 435.

The predicting, quantizing, and reconstructing unit 405 predicts a current pixel included in an image, generates a residue component representing a difference between a prediction value of the current pixel and a sample value of the current pixel, quantizes the residue component, and encodes the quantized residue component.

The predicting, quantizing, and reconstructing unit 405 may decode the encoded pixel, store the decoded pixel in the line buffer 410, and use the stored pixel to predict another pixel.

In detail, by using a modified median-adaptive predictor (MMAP), the predicting, quantizing, and reconstructing unit 405 may simultaneously predict three current pixels as shown in Table 1 below.

TABLE 1

```
filtB=(c+2*b+d+2)>>2;
diffC=CLAMP(filtC-c, -QuantDivisor[qLevel]/2, QuantDivisor[qLevel]/2);
blendC=c+diffC;
diffB=CLAMP(filtB-b, -QuantDivisor[qLevel]/2, QuantDivisor[qLevel]/2);
blendB=B+diffB;
diffD=CLAMP(filtD-d, -QuantDivisor[qLevel]/2, QuantDivisor[qLevel]/2);
blendD=d+diffD;                                                          JPEG-LS MED
diffE=CLAMP(filtE-e, -QuantDivisor[qLevel]/2, QuantDivisor[qLevel]/2);    P0=CLAMP(a+b-c, MIN(a, b), MAX(a, b));
blendE=e+diffE;
P0=CLAMP(a+blendB-blendC,        MIN(a, blendB),                MAX(a, blendB));
P1=CLAMP(a+blendD-blendC+R0,     MIN(a, blendB, blendD),        MAX(a, blendB, blendD));
P2=CLAMP(a+blendE-blendC+R0+R1,  MIN(a, blendB, blendD, blendE),MAX(a, blendB, blendD, blendE));
R0, R1 : Inverse-quantized residuals of first and second pixels
[First line]
P0=a;
P1=CLAMP(a+R0, 0, (1<<maxBpc)-1);
P2=CLAMP(a+R0, R1, 0, (1<<maxBpc)-1);
```

Referring to FIG. 3D, in operation 350, the decoding apparatus 25 may receive a bitstream including an encoded up-sampling image. In this case, the encoded up-sampling As illustrated in FIG. 4B, the predicting, quantizing, and reconstructing unit 405 may predict first, second, and third current pixels as P0, P1, and P2 respectively as shown in Table 1. That is, it may be possible to use a sample value of a pixel a which is previously decoded immediately before encoding the current pixels in the current line and sample values of pixels s, c, b, d, e, and f of the previous line stored in the line buffer 410.

Herein, −QuantDivisor[qLevel]/2, QuantDivisor[qLevel]/2 denotes a minimum value or a maximum value that may be currently quantized. CLAMP(a,b,c) denotes a function that outputs a when a is between b and c, outputs b when a is smaller than b, and outputs c when a is greater than c. MaxBpc denotes the maximum number of bits per channel.

For example, the predicting, quantizing, and reconstructing unit 405 determines a filtering output filtB of the pixel b by using the pixel b, the left pixel c adjacent to the pixel b, and the pixel d adjacent to the pixel b. In similar ways, the predicting, quantizing, and reconstructing unit 405 may determine filtering outputs filtC, filtD, and filtE of the pixels c, d, and e.

The predicting, quantizing, and reconstructing unit 405 may determine diffC related to the pixel c by using filtC, the value of the pixel c, and the minimum value or the maximum value that may be currently quantized. For example, the predicting, quantizing, and reconstructing unit 405 may determine diffC as a difference value filtC−c between the value of the pixel c and filtC that is between the minimum value and the maximum value that may be currently quantized. In similar ways, the predicting, quantizing, and reconstructing unit 405 may determine diffB, diffD, and diffE.

The predicting, quantizing, and reconstructing unit 405 may determine blendC related to the pixel c by using the value of the pixel c and filtC related to the pixel c. In similar ways, the predicting, quantizing, and reconstructing unit 405 may determine blendB, blendD, and blendE.

The prediction value P0 of the current first pixel may be determined by using the value of pixel a, blendB, and blendC. In the case of JPEG-LS standards, the prediction value P0 of the current pixel P0 is determined by using the value of the pixel a, the value of the pixel b, and the value of the pixel c. However, the predicting, quantizing, and reconstructing unit 405 may perform efficient encoding by using blendB instead of the value of the pixel b and blendC instead of the value of pixel c.

The prediction value P1 of the current second pixel may be determined by using the value of the pixel a, blendB, blendC, blendD, and a residual R0 of the current first pixel.

The prediction value P2 of the third pixel may be determined by using the value of the pixel a, blendB, blendC, blendD, blendE, the residual R0 of the current first pixel, and a residual R1 of the current second pixel.

In the case of the first line, since there is no previous line, the prediction value P0 of the current first pixel may be determined by using the value of the pixel a, and the prediction value P1 of the current second pixel may be determined by using the value of the pixel a, the residual R0 of the current first pixel, and the maximum number MaxBpc of bits per channel. Likewise, the prediction value P2 of the current third pixel may be determined by using the value of the pixel a, the residual R0 of the current first pixel, the residual R1 of the current second pixel, and the maximum number MaxBpc of bits per channel.

In order to predict the current, first, second, and third pixels (P0, P1, and P2), a block prediction (BP) may be used to perform another prediction as shown in Table 2 below.

TABLE 2

P[hPos]=recon[hPos+vpVector]
vpVector:−3~−10

As illustrated in FIG. 4C, the predicting, quantizing, and reconstructing unit 405 may determine a vpVector value and predict a current pixel with reference to the value of a relevant pixel according to the determined vpVector value. Herein, hPos denotes an index representing the position of the current pixel. For example, when hPos is 0, it denotes the current first pixel, and P[hPos] of the current first pixel may be a value that is predicted by using the value of a pixel in which an index representing the position of a reference pixel is hPos+vpVector according to the vpVector value (−3~−10).

By using a midpoint prediction (MPP), the predicting, quantizing, and reconstructing unit 405 may predict current three pixels differently as shown in Table 3 below.

TABLE 3 midpointPred=(1<<(maxBpc−1))+(a&((1<<qLevel)−1));
where a is left previous recon pixel,
(even if the previous group is on the previous line)

When the maximum value of residue components of the current three pixels is equal to or greater than the difference between the maximum number maxBpc of bits per channel and a quantization parameter qLevel, an MPP may be performed as illustrated in FIG. 4D. In this case, a prediction value midpointPred of current three bits may be determined by using the value of the pixel a, the maximum number of bits per channel, and the quantization parameter. In the case of an MPP-based prediction, the size of a residue component may be set according to the difference between the maximum number maxBpc of bits per channel and the quantization parameter qLevel.

The ICH mode determiner 415 may determine whether to use an ICH mode for the current three pixels. For example, the ICH mode determiner 415 may determine whether to use the MMAP or the ICH mode. The ICH mode will be described later in detail. The ICH mode may be suitable for patterns or graphics that are not well predicted by the MMAP but may refer to adjacent pixel values.

The line buffer unit 410 may store sample values of pixels located at a line previous to a line at which the current three pixels are located.

The entropy encoder 420 may entropy-encode residue components of the current three pixels and other encoding information. In detail, the entropy encoder 420 may variable length entropy-encode the residue components of the current three pixels and other encoding information.

In order to reduce a quantization distortion, the flatness determiner 425 determines whether there is a change from a region including a non-flat pixel to a region including a flat pixel. Based on the determination of the flatness determiner 425, the bit rate controller 430 may adjust the quantization parameter.

The bit rate controller 430 may control a bit rate on the basis of the state of the rate buffer 435, the number of bits used in current prediction, and the adjustment of the quantization parameter determined by the flatness determiner 425.

The rate buffer 435 temporarily stores a bitstream so that the bitstream may be transmitted without loss.

Figure 4E:
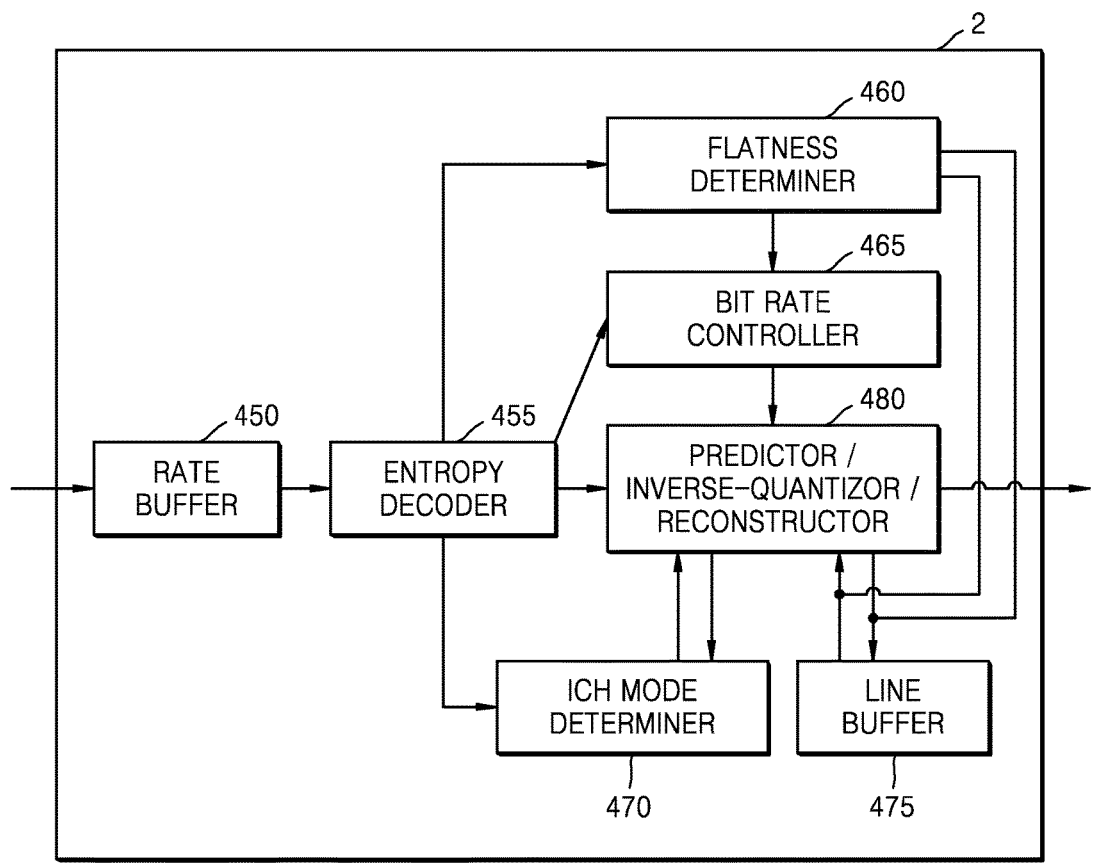
FIG. 4E is a block diagram illustrating a decoding apparatus according to an exemplary embodiment.

FIG. 4E is a block diagram of a decoding apparatus 2 according to an exemplary embodiment.

Referring to FIG. 4E, the decoding apparatus 2 includes a rate buffer 450, an entropy decoder 455, a flatness determiner 460, a bit rate controller 465, an ICH mode determiner 470, a line buffer 475, and a predicting, inverse-quantizing, and reconstructing unit (i.e., predictor/inverse-quantizor/reconstructor) 480.

The rate buffer 450 temporarily stores a bitstream so that the bitstream may be received without loss.

The entropy decoder 455 entropy-decodes a received bitstream.

In order to reduce a quantization distortion, on the basis of encoding information included in the received bitstream, the flatness determiner 460 determines whether there is a change from a region including a non-flat pixel to a region including a flat pixel.

Based on the determination of the flatness determiner 460, the bit rate controller 465 may adjust the quantization parameter.

The bit rate controller 465 may control a bit rate on the basis of the number of bits used in current prediction and the adjustment of the quantization parameter determined by the flatness determiner 460.

On the basis of the encoding information received from the bitstream, the ICH mode determiner 470 may determine whether to use an ICH mode for the current three pixels. For example, the ICH mode determiner 470 may determine whether to use the MMAP or the ICH mode. The ICH mode will be described later in detail. The ICH mode may be suitable for patterns or graphics that are not well predicted by the MMAP but may refer to adjacent pixel values.

The line buffer 475 may store sample values of pixels located at a line previous to a line at which the current three pixels are located.

The predicting, inverse-quantizing, and reconstructing unit 480 may predict a current pixel on the basis of the encoding information included in the received bitstream, inverse-binarize a residue component included in the bitstream, reconstruct current three pixels by synthesizing the inverse-binarization result with a prediction value of the current pixel, store a decoded pixel in the line buffer 475, and use the stored pixel to predict a next pixel.

In detail, by using an MMAP, the predicting, inverse-quantizing, and reconstructing unit 480 may predict three pixels as shown in Table 4 below.

and pixels s, c, b, d, e, and f of the previous line stored in the line buffer 475. Herein, −QuantDivisor[qLevel]/2, QuantDivisor[qLevel]/2 denotes a minimum value or a maximum value that may be currently quantized.

CLAMP(a,b,c) denotes a function that outputs a when a is between b and c, outputs b when a is smaller than b, and outputs c when a is greater than c. MaxBpc denotes the number of bits per channel. For example, the predicting, inverse-quantizing, and reconstructing unit 480 determines a filtering output filtB of the pixel b by using the pixel b, the left pixel c adjacent to the pixel b, and the pixel d adjacent to the pixel b. In similar ways, the predicting, inverse-quantizing, and reconstructing unit 480 may determine filtering outputs filtC, filtD, and filtE of the pixels c, d, and e.

The predicting, inverse-quantizing, and reconstructing unit 480 may determine diffC related to the pixel c by using filtC, the value of the pixel c, and the minimum value or the maximum value that may be currently quantized. For example, the predicting, inverse-quantizing, and reconstructing unit 480 may determine diffC as a difference value filtC−c between the value of the pixel c and filtC that is between the minimum value and the maximum value that may be currently quantized. In similar ways, the predicting, inverse-quantizing, and reconstructing unit 480 may determine diffB, diffD, and diffE.

The predicting, inverse-quantizing, and reconstructing unit 480 may determine blendC related to the pixel c by using the value of the pixel c and filtC related to the pixel c. In similar ways, the predicting, quantizing, and reconstructing unit 405 may determine blendB, blendD, and blendE.

The prediction value P0 of the current first pixel may be determined by using the value of pixel a, blendB, and blendC. In the case of JPEG-LS standards, the prediction value P0 of the current pixel P0 is determined by using the value of the pixel a, the value of the pixel b, and the value of the pixel c. However, the predicting, inverse-quantizing, and reconstructing unit 480 uses blendB instead of the value of the pixel b and blendC instead of the value of pixel c.

The prediction value P1 of the current second pixel may be determined by using the value of the pixel a, blendB, blendC, blendD, and a residual R0 of the current first pixel.

The prediction value P2 of the third pixel may be determined by using the value of the pixel a, blendB, blendC,

TABLE 4 filtB=(c+2*b+d+2)>>2;
diffC=CLAMP(filtC−c, −QuantDivisor[qLevel]/2, QuantDivisor[qLevel]/2);
blendC=c+diffC;
diffB=CLAMP(filtB−b, −QuantDivisor[qLevel]/2, QuantDivisor[qLevel]/2);
blendB=B+diffB;
diffD=CLAMP(filtD−d, −QuantDivisor[qLevel]/2, QuantDivisor[qLevel]/2);
blendD=d+diffD;                                              JPEG−LS MED
diffE=CLAMP(filtE−e, −QuantDivisor[qLevel]/2, QuantDivisor[qLevel]/2);   P0=CLAMP(a+b−c, MIN(a, b), MAX(a, b));
blendE=e+diffE;
P0=CLAMP(a+blendB−blendC,      MIN(a, blendB),               MAX(a, blendB));
P1=CLAMP(a+blendD−blendC+R0,   MIN(a, blendB, blendD),       MAX(a, blendB, blendD));
P2=CLAMP(a+blendE−blendC+R0+R1, MIN(a, blendB, blendD, blendE), MAX(a, blendB, blendD, blendE));
R0, R1 : Inverse-quantized residuals of first and second pixels
[First line]
P0=a;
P1=CLAMP(a+R0, 0, (1<<maxBpc)−1);
P2=CLAMP(a+R0, R1, 0, (1<<maxBpc)−1);

As illustrated in FIG. 4B, first, second, and third current pixels may be predicted as P0, P1, and P2 respectively. That is, it may be possible to use a sample value of pixel a which is previously decoded immediately before the current line blendD, blendE, the residual R0 of the current first pixel, and a residual R1 of the current second pixel.

In the case of the first line, since there is no previous line, the prediction value P0 of the current first pixel may be determined by using the value of the pixel a, and the prediction value P1 of the current second pixel may be determined by using the value of the pixel a, the residual R0 of the current first pixel, and the maximum number MaxBpc of bits per channel. Likewise, the prediction value P2 of the current third pixel may be determined by using the value of the pixel a, the residual R0 of the current first pixel, the residual R1 of the current second pixel, and the maximum number MaxBpc of bits per channel.

In order to predict the current, first, second, and third pixels, a BP may be used to perform another prediction as shown in Table 5 below.

TABLE 5

P[hPos]=recon[hPos+vpVector]
vpVector:−3∼−10

As illustrated in FIG. 4C, the predicting, inverse-quantizing, and reconstructing unit 480 may determine a vpVector value and predict a current pixel with reference to the value of a relevant pixel according to the determined vpVector value. Herein, hPos denotes an index representing the position of the current pixel. For example, when hPos is 0, it denotes the current first pixel, and P[hPos] of the current first pixel may be a value that is predicted by using the value of a pixel in which an index representing the position of a reference pixel is hPos+vpVector according to the vpVector value (−3∼−10).

By using an MPP, the predicting, inverse-quantizing, and reconstructing unit 480 may predict current three pixels as shown in Table 6 below.

TABLE 6 midpointPred=(1<<(maxBpc−1))+(a&((1<<qLevel)−1));
where a is left previous recon pixel,
(even if the previous group is on the previous line)

When the maximum value of residue components of the current three pixels is equal to or greater than the difference between the maximum number maxBpc of bits per channel and a quantization parameter qLevel, an MPP may be performed as illustrated in FIG. 4D. In this case, a prediction value midpointPred of current three bits may be determined by using the value of the pixel a, the maximum number of bits per channel, and the quantization parameter. In the case of an MPP-based prediction, the size of a residue component may be set according to the difference between the maximum number maxBpc of bits per channel and the quantization parameter qLevel.

Figure 5:
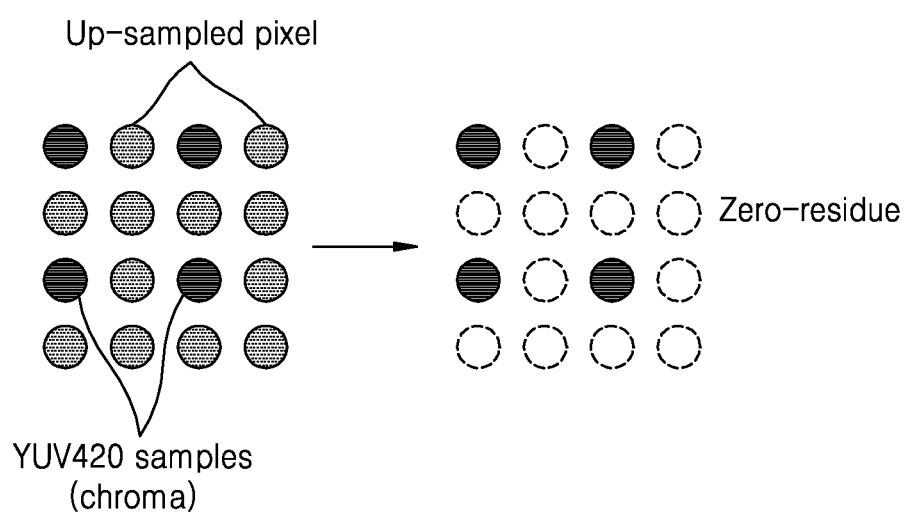
FIG. 5 is a diagram illustrating a process of encoding by allocating a zero-residue to an up-sampled pixel according to an exemplary embodiment.

FIG. 5 is a diagram illustrating a process of encoding by allocating a zero-residue to an up-sampled pixel according to an exemplary embodiment.

It is assumed that an image input to the encoding apparatus 10 is a YUV 4:2:0 format image. Also, it is assumed that the input image is converted into a YUV 4:4:4 format image. That is, it is assumed that the input image is up-sampled. That is, an up-sampled chroma image may include YUV 4:2:0 format chroma samples (YUV420 samples) and up-sampled chroma pixels (up-sampled pixels).

Referring to FIG. 5, a YUV 4:2:0 format chroma image is up-sampled into a YUV 4:4:4 format chroma image. There are an up-sampled pixel and a pixel (YUV 4:2:0 sample) existing in the YUV 4:2:0 format chroma image.

The encoding apparatus 10 predicts a current pixel in the process of encoding a chroma image, generates a residue component representing the difference between a prediction value of the current pixel and an actual value of the current pixel, and generates encoding information by quantizing and entropy-encoding the generated residue component. In this case, the encoding efficiency may be increased by minimizing the generation of residue data by replacing a residue component of a pixel of an up-sampling region with "0" and quantizing and entropy-encoding the replaced residue component.

However, the encoding apparatus 10 is not limited to an operation of replacing the residue component with "0" and may replace the residue component with any predetermined value.

Figure 6:
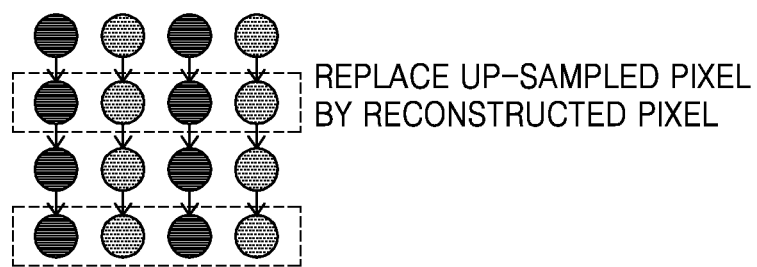
FIG. 6 is a diagram illustrating a process of changing a sample value of an up-sampled pixel by using an encoded and decoded sample value of a pixel adjacent to an up-sampled pixel according to an exemplary embodiment.

FIG. 6 is a diagram illustrating a process of replacing a sample value of an up-sampled pixel by using an encoded and decoded sample value of a pixel adjacent to an up-sampled pixel according to an exemplary embodiment.

Referring to FIG. 6, a YUV 4:2:0 format chroma image is up-sampled into a YUV 4:4:4 format chroma image. It is assumed that odd lines of the chroma image are already encoded and decoded.

In the YUV 4:2:0 format chroma image, even lines have no chroma data. Thus, in the YUV 4:4:4 format chroma image, an even-line image includes up-sampled chroma pixels. In this case, the encoding apparatus 20 may predict a sample value of the current even line by using a sample value of the odd line located on top of the current even line. The sample value of the even line may be replaced with the predicted sample value of the even line. A current pixel is predicted by using the replaced sample value, and a residue component of the current pixel is generated. Since the sample value is replaced with a sample value predicted from a sample value of an adjacent reconstructed pixel, when the current pixel is predicted by using the adjacent pixel, a value closer to an actual sample value of the current pixel may be predicted. Thus, the generation of a residue component of the current pixel may be minimized. Thus, the encoding efficiency may be improved by minimizing the generation of the residue component.

Figure 7A:
FIG. 7A is a diagram illustrating a process of suppressing the occurrence of an index color history (ICH) mode of an up-sampled line according to an exemplary embodiment.
Figure 7A:

FIG. 7A is a diagram illustrating a process of suppressing the occurrence of an ICH mode of an up-sampled line according to an exemplary embodiment.

Referring to FIG. 7A, a YUV 4:2:0 format chroma image is up-sampled into a YUV 4:4:4 format chroma image. In the YUV 4:2:0 format chroma image, odd or even lines have no chroma data. In an exemplary embodiment, it is assumed that even lines have no chroma data. In the YUV 4:4:4 format chroma image, all data of even lines are up-sampled chroma data. Thus, the encoding apparatus 10 or 20 may not encode the even lines according to the ICH mode.

The encoding efficiency may be improved by minimizing the generation of an index overhead for the ICH mode by preventing the encoding apparatus 10 or 20 from encoding the up-sampled line according to the ICH mode.

The up-sampled line has been described above in an exemplary embodiment. However, exemplary embodiments are not limited thereto, and any up-sampling region might not be encoded according to the ICH mode.

Figure 7B:
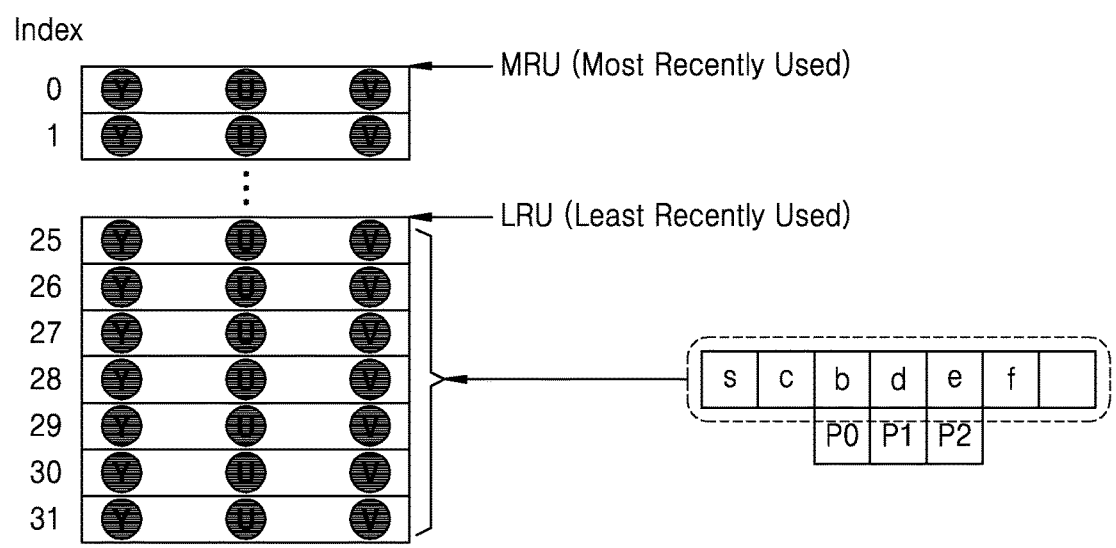
FIG. 7B is a diagram illustrating an ICH mode according to an exemplary embodiment.

FIG. 7B is a diagram illustrating an ICH mode according to an exemplary embodiment.

The encoding apparatus 1 performs encoding on a three-pixel basis. In this case, the encoding apparatus 1 may simultaneously predict three pixels. It is assumed that pixels P0, P1, and P2 are to be predicted. Pixels s, c, b, d, e, and f are pixels encoded and decoded in the previous line. The sample values of YUV components of the pixels may be stored in a predetermined storage space and then accessed by a 5-bit index. The encoding apparatus 1 inserts the entry for most recently used (MRU) color values at the head of ordered list in the predetermined storage space with older entries for least recently used (LRU) color values shifted down.

For example, the sample values of YUV components at the positions of pixels of the previous line up to index 25-31 may be accessed. In the ICH mode, when the sample values of YUV components are accessed by an index, the accessed value is a prediction value of the pixel that is currently predicted. Up to index 0-24, the sample values of YUV components of previously-encoded and decoded pixels are stored in a line that is currently predicted.

In the result, the ICH mode refers to a mode in which the values of YUV components of recently-used pixels are stored and a prediction value of a currently-predicted pixel is determined with reference to a value by using a specific index.

For example, when the sample values of YUV components are respectively 10, 9, and 8 in the pixel b, the values may be stored in a line buffer and may be accessed by the index 27. In the case of determining a prediction value of the current pixel P0, encoding may be performed according to the ICH mode, and the sample values of YUV components of the pixel b may be determined as the prediction values of YUV components of the current pixel P0. In this case, the index 27 and information about whether to use the ICH mode may be included in a bitstream. The decoding apparatus 2 may determine the prediction values of YUV components of the current pixel P0 according to the ICH mode by using the index and the information about whether to use the ICH mode, which are included in the bitstream.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made without departing from the spirit and scope of the inventive concepts as defined by the following claims.

What is claimed is:
1. A method comprising:
receiving an image;
up-sampling the received image;
changing a sample value of an up-sampling region included in the up-sampled image and encoding the up-sampled image by using the changed sample value,
wherein the up-sampling region is a region inserted into the received image by the up-sampling,
the sample value of the up-sampling region is predicted by using a sample value that is previously encoded and decoded in a region adjacent to the up-sampling region, and the changed sample value of the up-sampling region is the predicted sample value of the up-sampling region, and
wherein the encoding of the up-sampled image comprises:
when an up-sampled line, including only the up-sampling region for chroma components, is encoded, encoding the up-sampled line according to a prediction mode other than an Index Color History (ICH) mode from among a plurality of prediction modes, and
when a line other than the up-sampled line, which includes the up-sampling region for chroma components and non up-sampling region, or only includes non up-sampling region, is encoded, encoding the line other than the up-sampled line according to the ICH mode.

2. The method of claim 1, wherein
the encoding of the line other than the up-sampled line comprises encoding the line other than the up-sampled line according to the ICH mode in which one of plurality of previously encoded, decoded and stored sample values is set as a prediction value of at least one sample included in the line other than the up-sampled line by using an index which indicates the one of the plurality of previously encoded, decoded and stored sample values.

3. A method comprising:
receiving a bitstream including an up-sampling image encoded by using a changed sample value of an up-sampling region included in an up-sampled image;
decoding the encoded up-sampling image; and
down-sampling the decoded up-sampling image,
wherein a sample value of the up-sampling region is predicted by using a sample value that is previously encoded and decoded in a region adjacent to the up-sampling region, and
the encoded up-sampling image is generated by encoding the up-sampled image by using the predicted sample value of the up-sampling region, and
wherein the decoding of the encoded up-sampling image comprises:
when an up-sampled line including only the up-sampling region for chroma components is decoded, decoding the up-sampled line according to a prediction mode other than an Index Color History (ICH) mode from among a plurality of prediction modes,
when a line other than the up-sampled line, which includes the up-sampling region for chroma components and non up-sampling region, or only includes non up-sampling region, is decoded, decoding the line other than the up-sampled line according to the ICH mode.

4. The method of claim 3, wherein
the decoding of the line other than the up-sampled line comprises decoding the line other than the up-sampled line according to the ICH mode in which one of plurality of previously encoded, decoded and stored sample values is set as a prediction value of at least one sample included in the line other than the up-sampled line by using an index which indicates the one of the plurality of previously encoded, decoded and stored sample values, and
wherein the bitstream includes the index.

5. An apparatus comprising:
at least one processor configured to:
receive an image;
up-sample the received image; and
change a sample value of an up-sampling region included in the up-sampled image, and encode the up-sampled image by using the changed sample value,
wherein the up-sampling region is a region inserted into the received image by the up-sampling, the sample value of the up-sampling region is predicted by using a sample value that is previously encoded and decoded in a region adjacent to the up-sampling region, and the changed sample value of the up-sampling region is the predicted sample value of the up-sampling region, and wherein in the encoding of the up-sampled image, when an up-sampled line, including only the up-sampling region for chroma components, is encoded, the at least one processor encodes the up-sampled line according to a prediction mode other than an Index Color History (ICH) mode, from among a plurality of prediction modes, and when a line other than the up-sampled line, which includes the up-sampling region for chroma components and non up-sampling region, or only includes non up-sampling region, is encoded, the at least one processor encodes the line other than the up-sampled line according to the ICH mode.

6. An apparatus comprising:

at least one processor configured to:

receive a bitstream including an up-sampling image encoded by using a changed sample value of an up-sampling region included in an up-sampled image;

decode the encoded up-sampling image; and down-sample the decoded up-sampling image, wherein a sample value of the up-sampling region is predicted by using a sample value that is previously encoded and decoded in a region adjacent to the up-sampling region, and the encoded up-sampling image is generated by encoding the up-sampled image by using the predicted sample value of the up-sampling region, wherein the at least one processor is further configured to, when an up-sampled line, including only the up-sampling region for chroma components, is decoded, decode the up-sampled line according to a prediction mode other than an Index Color History (ICH) mode from among a plurality of prediction modes, and when a line other than the up-sampled line, which includes the up-sampling region for chroma components and non up-sampling region, or only includes non up-sampling region, is decoded, decode the line other than the up-sampled line according to the ICH mode.

7. A non-transitory computer-readable recording medium having stored thereon a program that performs a method, the method comprising:

receiving an image;

up-sampling the received image;

changing a sample value of an up-sampling region included in the up-sampled image and encoding the up-sampled image by using the changed sample value, wherein the up-sampling region is a region inserted into the received image by the up-sampling, the sample value of the up-sampling region is predicted by using a sample value that is previously encoded and decoded in a region adjacent to the up-sampling region, and the changed sample value of the up-sampling region is the predicted sample value of the up-sampling region, and wherein the encoding of the up-sampled image comprises:

when an up-sampled line, including only the up-sampling region for chroma components, is encoded, encoding the up-sampled line according to a prediction mode other than an Index Color History (ICH) mode from among a plurality of prediction modes, and when a line other than the up-sampled line, which includes the up-sampling region for chroma components and non up-sampling region, or only includes non up-sampling region, is encoded, encoding the line other than the up-sampled line according to the ICH mode.

\* \* \* \* \*